Aug. 30, 1932.  O. P. McCARTY ET AL  1,875,250
ELECTRICAL FREQUENCY CHANGER
Filed Sept. 29, 1930    2 Sheets-Sheet 2

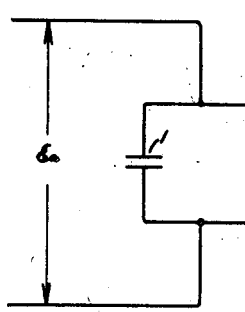
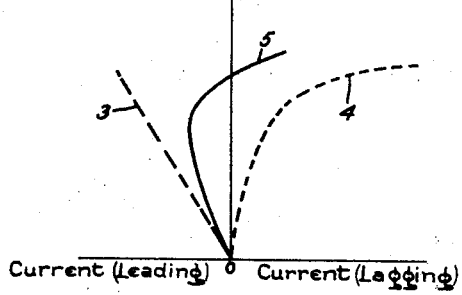
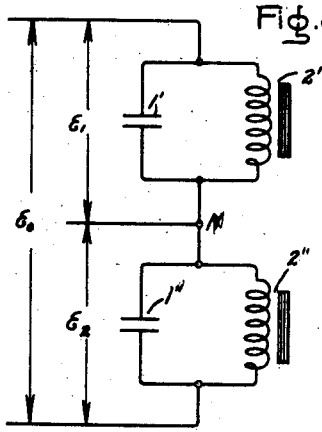
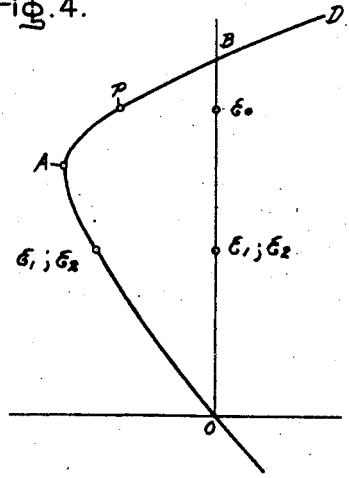
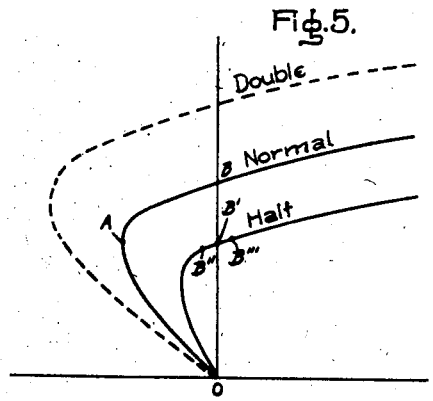
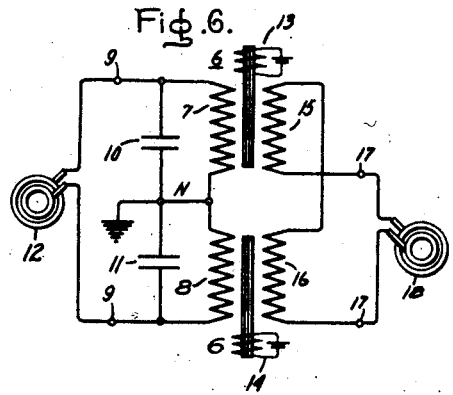
Inventors:
Orin P. McCarty.
Aram Boyajian.
by Charles W. Tullar
Their Attorney.

Inventors:
Orin P. McCarty.
Aram Boyajian.
by Charles E. Mullen
Their Attorney.

Patented Aug. 30, 1932

1,875,250

UNITED STATES PATENT OFFICE

ORIN P. McCARTY AND ARAM BOYAJIAN, OF PITTSFIELD, MASSACHUSETTS, ASSIGNORS TO GENERAL ELECTRIC COMPANY, A CORPORATION OF NEW YORK

ELECTRICAL FREQUENCY CHANGER

Application filed September 29, 1930. Serial No. 485,277.

Our invention relates to alternating current frequency converters or changers and particularly to static frequency converters.

It is often desirable to convert alternating current at one frequency to a higher or lower frequency, so as to permit, for example, the interchange of power between systems having different frequencies. This conversion is usually performed by rotating apparatus such as motor generator sets. Such apparatus, to mention a few objections to it, is relatively expensive, has unavoidable friction and windage losses and is not inherently self starting.

A few different types of frequency converters involving no moving parts have been developed up to the present time. Such converters are known as static converters to distinguish them from converters involving movable parts and as a rule they are not open to any of the above noted objections to the usual rotatable frequency converter. It is believed, however, that in the past no static frequency converters have combined the advantageous feature of reversibility with the ability to convert polyphase alternating current energy at a given frequency directly to some even multiple of this frequency, particularly double frequency or half frequency. In accordance with our invention we provide such a static frequency converter.

An object of our invention is to provide a new and improved static frequency converter.

Another object of our invention is to provide a novel static frequency changer which is particularly adapted to divide by two or double a given input frequency.

A further object of our invention is to provide a novel polyphase static frequency converter.

Our invention will be better understood from the following description when taken in connection with the accompanying drawings and its scope will be pointed out in the appended claims.

Figure 7:
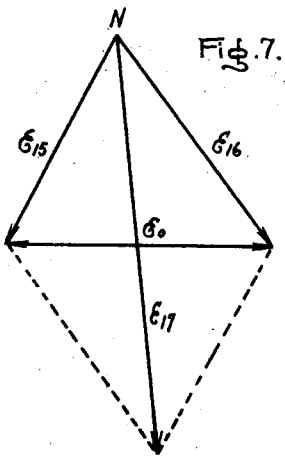
Figure 8:
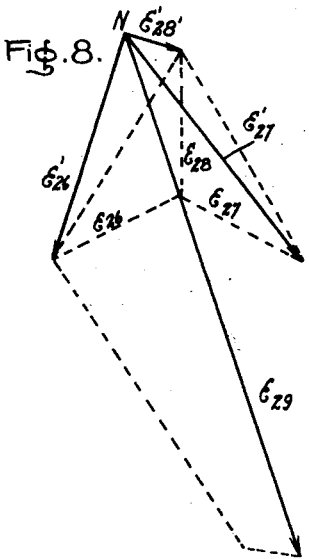
Figure 9:
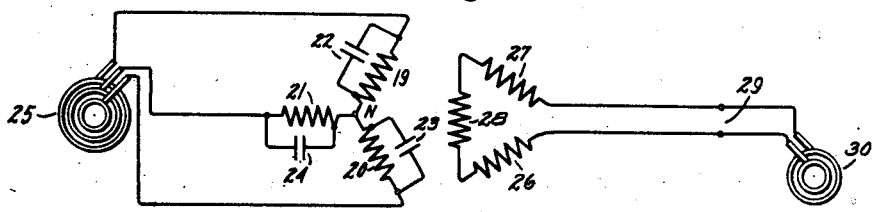
Figure 10:
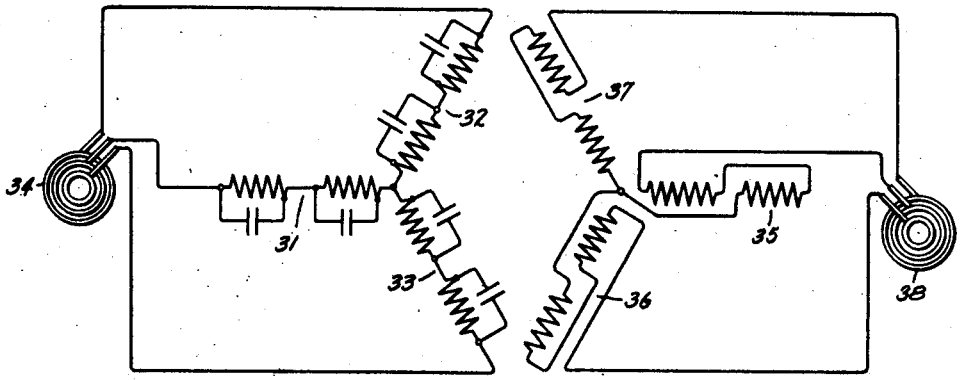

In the drawings, Fig. 1 shows a basic unit of our invention comprising a saturable core reactor connected in parallel with a condenser; Fig. 2 illustrates the volt-ampere characteristics of a saturable core reactor, a condenser, and a combination of the two connected in parallel as in Fig. 1; Fig. 3 illustrates two of the units shown in Fig. 1 connected in series; Fig. 4 is an enlarged view of the volt-ampere characteristic of Fig. 3 for illustrating the operation of our invention; Fig. 5 illustrates the effect of frequency variations on the volt-ampere characteristic; Fig. 6 is a completed embodiment of our invention for changing the frequency of single phase currents; Fig. 7 is a vector diagram of the voltage relations occurring in Fig. 6; Fig. 8 is a similar vector diagram for the embodiment of our invention shown in Fig. 9; Fig. 9 illustrates a modification of our invention as embodied in a converter for changing polyphase alternating current of one frequency to single phase current at another frequency; Fig. 10 illustrates a modification of our invention for converting polyphase alternating current from one frequency to another.

Referring now to the drawings, Figs. 1 to 5, inclusive, are provided for illustrating the theory of operation of our invention. In Fig. 1, 1 and 2 are a condenser and a saturable core reactor, respectively, which are connected in parallel so that a voltage $E_0$ may be applied across them, Fig. 3 illustrates two of the units shown in Fig. 1 connected in series.

In Fig. 6 we have illustrated an embodiment of our invention which is adapted to change the frequency of single phase alternating current. In this figure, a pair of saturable core transformers 6 have two of their windings 7 and 8 connected in series to terminals 9 while connected in parallel with each of these windings are separate condensers 11 and 12. Transformers 6 are similar and it will be assumed that they have a unit ratio of transformation although our invention is not limited to such a ratio. Terminals 9 are connected to a single phase system shown as comprising a synchronous machine 12. Each of the transformers 6 are provided with separate means 13 and 14, respectively, for producing a magnetic bias in their respective cores and as shown these means comprise direct current windings which are energized by suitable sources of direct current such as ordinary batteries. The other windings 15 and 16 of the transformers are connected in series opposition to the terminals 17 which connect to another single phase alternating current system shown as comprising a synchronous machine 18.

Fig. 9 illustrates an embodiment of our invention in which polyphase alternating current at one frequency may be changed to single phase alternating current at a different frequency or vice versa. In this figure three transformers similar to those of Fig. 6 have three of their windings 19, 20 and 21 connected in star to a polyphase alternating current system shown as comprising a synchronous machine 25. Condensers 22, 23, 24 are connected in parallel with these windings. The other windings 26, 27, and 28 of these transformers are connected in open delta to terminals 29 which are also connected in a single phase system shown as comprising a synchronous machine 30.

Fig. 10 illustrates an embodiment of our invention for changing polyphase current of one frequency to polyphase current of a different frequency. This modification consists essentially of three single phase frequency changers as shown in Fig. 6 which are connected in star. The three sets of series connected transformer windings with their parallel condensers which are designated by characters 31, 32, and 33 are connected in star to a three phase alternating current system shown as comprising a synchronous machine 34 while the three sets of series opposition connected windings 35, 36, and 37 are connected in star to a three phase alternating current system shown as comprising a synchronous machine 38. Thus corresponding leg or line to neutral voltages on each side of the different frequency systems have associated therewith a single phase frequency changer similar to the changer illustrated in Fig. 6.

The theory of operation of our invention is as follows: In Fig. 2, the dotted curve designated by character 3 is the volt-ampere characteristic of a condenser. As shown, it is a straight line, the leading current increasing directly proportionally to an increase in voltage. The dotted curve designated by character 4 is the volt-ampere characteristic of a saturable core reactance. This curve is the same as the magnetizing curve of the core material and is approximately a straight line for the lower voltages but quickly flattens out as the voltage increases beyond a certain point. This is due to saturation of the core material which makes necessary larger and larger current values in order to produce equal changes in the magnitude of the flux. Although the actual magnetizing current of a reactor or transformer includes a power component for supplying core losses as well as harmonic currents, the magnitudes of these currents are usually so small with respect to the quadrature lagging component of the magnetizing current that they have been neglected. Curve 5 is a combination of curves 3 and 4 is therefore the volt-ampere characteristic of the condenser and reactor in parallel.

Fig. 4 is an enlarged view of curve 5 of Fig. 2. To facilitate an analysis of this curve, it is divided into three parts, O—A, A—B, and B—D, respectively. In part O—A the current is leading and the combination of a condenser and saturable core reactance connected in parallel with it acts as a condenser alone. In part A—B, the current is still leading although the voltage is higher than for part O—A. However, as the voltage increases, the current decreases. In terms of impedance, the gross apparent reactance of the combination for the current is still leading or capacitive but its incremental reactance, that is, the reactance for superposed lower currents is lagging or inductive. In other words, the reactance considered as $$\frac{E}{I}$$

is negative, leading and capacitive while the reactance considered as $$\frac{\Delta E}{\Delta I}$$

is positive, lagging and inductive. Now, such a characteristic is a source of instability under suitable conditions in the same way that an arc whose incremental resistance is opposite to its gross resistance is known to be unstable. In the part B—D of the curve, the current is lagging and increases in magnitude with the increases of voltage supplied. The combination of elements shown in Fig. 1 therefore acts like an ordinary reactance in this part of the curve.

If now, a voltage $E_0$ is applied to the two sets of parallel connected condensers and reactors shown in Fig. 3, the combination may be operative at a point P on the curve of Fig. 4. It will be seen that this point is on the unstable portion of the curve while each of the individual units will be operated at voltages E1 and E2, respectively, which fall in the stable part O—A of the curve of Fig. 4. As the point P is in the unstable part of the curve, a disturbance in the energizing circuit of the combination shown in Fig. 3 will start point P moving up or down along the curve until it reaches a stable part when it may overtravel and again swing back introducing an oscillation and if the capacitive and reactive units are of the proper order of magnitude, this oscillation may be maintained permanently.

Turning now to Fig. 5 which shows the effect of changes in frequency on the volt-ampere characteristic of the arrangement shown in Figs. 1 and 2, the middle curve is the normal frequency curve while the outer dotted curve is the double frequency curve and the inner curve is the half frequency curve. It is easy to check that the higher frequency curves will fall outside the normal frequency curve and the lower frequency curves will fall inside the normal frequency curve because considering first the condenser volt-ampere characteristic alone increases in frequency decreases its capacitive reactance and thus would tend to make the capacity volt-ampere characteristic flatter while decreases in the frequency increases the capacitive reactance and therefore tends to make the condenser volt-ampere characteristic more nearly vertical. On the other hand increasing the frequency increases the inductive reactance of the reactor and thus would make the higher frequency volt-ampere characteristic of the reactance fall outside the normal curve while a lower frequency would make the volt-ampere characteristic fall inside the normal curve.

If in Fig. 5, the normal frequency operation of the combination shown in Fig. 3 is around point A on the normal frequency curve, the half frequency oscillation will be around point B' on the half frequency curve. There are two possible kinds of oscillation. The first is where the capacitive and inductive reactance of each leg or half of Fig. 3, oscillate against each other. If the phase of oscillation of each branch is 180 degrees from the oscillation of the other, the neutral N will oscillate without showing any oscillation voltage or current in the supply conductors. With this type of oscillation both units oscillate about the point B' of Fig. 5. The second kind of oscillation is where one leg or branch shows a net inductive reactance while the other leg has a net capacitive reactance. In this case, the neutral N will oscillate without any oscillation in voltage in the energizing conductors but there will be an oscillating current. This is illustrated in Fig. 5 where, for example, one unit is oscillating about the point B'' while the other is oscillating about the point B''', for B is in the condensive part of the curve, while B''' is in the inductive part of the curve. The distinction between those two types of oscillation is of no great importance for one merges into the other. Thus, points B'' and B'''' may both approach B' and actually merge into it. Thus, the first type of oscillation is a limiting case of the second type.

We have found that these oscillations may be loaded to a considerable extent and that the oscillation frequency is most stable in zones corresponding to the nearest harmonic relationship to the normal frequency, that is to say the second or one-half harmonic. That this should be so is clearly illustrated by the curve Fig. 5 where the half frequency oscillation B' corresponds in voltage to the normal frequency point A. The permanence and strength of the half or double frequency oscillation is improved if the reactor cores are magnetically biased as by providing them with a direct current biasing winding or designing them to have sufficient residual magnetism in themselves. This follows from the fact that a magnetic bias in the core of a reactance or transformer distorts the sine wave of the magnetizing current into a wave having unequal positive and negative halves and the harmonic analysis of such a wave shows that it contains even harmonics with a predominating second harmonic.

Referring now to the single phase modification shown in Fig. 6. As will be seen, this figure differs from Fig. 3 primarily in that the reactors of Fig. 3 are provided respectively with inductively related windings, that is to say, transformer windings 15 and 16 which are connected in series opposition. Thus, the reactors are replaced by two winding transformers. In addition, these transformers have means for producing a magnetic bias in their cores. Assume now that in Fig 6 the power flow is from left to right, that is to say, machine 12 is acting as a generator and machine 18 is acting as a motor. If, now, condensers 10 and 11 are of the proper values, the alternating potential across terminals 9 will cause the neutral point N to oscillate with the result that two voltages are induced in each of the secondary windings 15 and 16. One of these voltages is at normal frequency, that is, the frequency of generator 12, while the other is of the oscillation frequency. As the secondary windings are connected in series opposition, the fundamental frequency voltages will cancel each other, while an oscillation voltage will appear across the terminals 17. The reason that the oscillation voltage appears in the circuit including windings 15 and 16 is that the individual instantaneous oscillating voltages in each of these windings can never be both equal and opposite and so cancel each other, as do the normal frequency voltages in these windings. This follows when it is remembered that these oscillating voltages are the result of the oscillations of the point N and consequently the magnitude of the net oscillation voltage will always be twice the displacement voltage of the neutral point N. The following discussion of Fig. 7 illustrates this for a particular kind of oscillation of the neutral but a consideration of this figure shows that it is also true for any other kind of neutral oscillation. The oscillation voltage may even be greater in magnitude than the normal impressed voltage because the oscillation of the neutral point need not necessarily be in phase with the impressed normal frequency voltage. Thus, in Fig. 7, the horizontal vector $E_0$ represents the magnitude of the voltage across the terminals 9 while point N represents the displacement of the neutral in one of its extreme positions. Thus, the vectors $E_{15}$ and $E_{16}$ represent the oscillation frequency voltages in the secondary windings 15 and 16 while their sum $E_{17}$ equals twice the displacement voltage of the neutral N and as shown, it is greater in magnitude than the impressed voltage $E_9$. The vector diagram Fig. 7 is, of course, only for the case where the ratio of transformation of the transformers is unity.

The arrangement shown in Fig. 6 may change the frequency of machine 12 to either higher or lower values depending primarily upon the capacity of the condensers 10 and 11. A larger value of capacitance is necessary for a frequency reduction than for a frequency multiplication. The function of means 13 and 14 is to produce greater stability when the frequency change is to either double frequency or one-half frequency. Our invention, however, is not limited to the use of special biasing means, and cores having residual magnetism may be used to produce a similar result although the use of positive biasing means as shown is more reliable.

We have also found that the operation of the arrangement shown in Fig. 6 is reversible and that power may be made to flow from right to left. The frequency ratio is governed by the magnitude of the capacities. Although it is not necessary, greater stability and reliability is secured if the low frequency side of the changer is connected to a source of the low frequency voltage so as to definitely set this frequency. Such a source need not supply power to the load but in cases where the low frequency load is not a dynamo electric machine which is in itself a source of the low frequency voltage, it is desirable to have such a source for steadying the frequency.

The principle of operation of the modification shown in Fig. 9 is similar to the operation of Fig. 6. Thus, assuming machine 25 to be a source, there is connected between each of its pairs of terminals an oscillation generator as shown in Fig. 3. As the secondary windings 26, 27, and 28 are connected in open delta, the three phase normal frequency voltages will cancel out to zero while the oscillation frequency voltage will be tripled and will appear across the terminals 29. This is illustrated in Fig. 8 where $E_{26}$, $E_{27}$, $E_{28}$ have a vector sum of zero while the voltages $E'_{26}$, $E'_{27}$, $E'_{28}$ have a vector sum of $E_{29}$ which is three times the magnitude of the neutral shift. The arrangement shown in Fig. 9 is reversible and power may be made to flow in either direction. Also various frequency ratios are obtainable depending upon the magnitude of the parallel capacitors, the ratios of 1:2 and 2:1 being particularly stable when the cores of the transformers are magnetically biased as by special biasing means or by residual magnetism.

The operation of Fig. 10 is the same as the operation of Fig. 6 for it comprises three of the single phase changers shown in Fig. 6 which are connected in star on both sides, to two three phase systems. Thus, in operation the frequency of each line to neutral voltage on the input side is changed to a different line to neutral voltage on the output side.

Although we have illustrated Fig. 10 in connection with a three phase system, it will, of course, be obvious to those skilled in the art that it is equally applicable to any number of phases. It will also be obvious to those skilled in the art that a star connection is not the only possible connection and that three of the units shown in Fig. 6 may equally well be connected in mesh on either or both their primary or secondary sides, without departing from our invention in its broader aspects.

Our invention is not limited to connecting the capacitance of each transformer unit across its primary winding and it will occur to those skilled in the art that the capacitance might be connected across the secondary windings or it might be lumped together and put in series with the neutral or in series with the open delta of Fig. 9 without departing from our invention in its broader aspects.

It should be understood that the biasing means 13 and 14 of Fig. 6 are merely illustrative of biasing means in general. In actual practice the particular arrangement illustrated would probably not be used, unless there was a high leakage reactance between the saturating windings and the other windings, because the saturating windings would probably act as short circuited turns. It may of course be assumed that there is a high leakage reactance between the saturating windings and the other windings of Fig. 6. Another way of providing effective biasing means would be to connect the saturating windings in series opposition so that the induced alternating voltages would cancel each other.

While we have shown and described particular embodiments of our invention, it will be obvious to those skilled in the art that changes and modifications may be made without departing from our invention, and we therefore aim in the appended claims to cover all such changes and modifications as fall within the true spirit and scope of our invention.

What we claim as new and desire to secure by Letters Patent of the United States, is:

1. A static frequency converter comprising a pair of transformers each having two windings, one winding of each of which is connected in series with the other, the remaining windings being connected in series opposition and separate capacitances connected in parallel with one of the windings of each of said transformers.

2. A static frequency converter comprising a pair of similar two winding transformers, means connecting corresponding windings of said transformers in series and in series opposition respectively, and separate capacitances connected in parallel with the windings which are connected in series.

3. A static frequency converter including a pair of similar two winding transformers, a source of magnetic bias for the magnetic circuit of each transformer, means connecting corresponding windings of said transformer in series and in series opposition respectively, and separate capacitances connected in parallel with one of the windings of each of said transformers.

4. A frequency changer including a pair of series connected oscillating circuits each of which comprises a capacitance connected in parallel with a saturable core reactance.

5. A frequency changer including a pair of series connected oscillating circuits each of which comprises a capacitance connected in parallel with a saturable core reactance, and a source of magnetic bias for the cores of said reactors whereby the oscillation frequency of said individual oscillating circuits tends to be stable at an even multiple of the frequency of said series combination of circuits.

6. A polyphase frequency changing system comprising, two polyphase circuits of different frequencies, a plurality of saturable core transformers, a star connected network connected to one of said circuits, each leg of said network including two windings of two different of said transformers connected in series, separate capacitances connected in parallel with each of said windings, the remaining windings of said transformers being connected in series opposition in pairs corresponding to the series connected pairs, said windings which are connected in series opposition pairs forming the legs of a star connected network which is connected to said other circuit.

7. A polyphase frequency changing system comprising, a pair of different frequency polyphase circuits, a plurality of saturable core transformers, star connected networks connected to each of said circuits, corresponding legs of said networks including respectively series connected and series opposition connected windings of two of said transformers, separate capacitances connected in parallel with each of said series connected windings, and a source of magnetic bias for each of said transformers whereby the ratios of frequency of said circuits tend to be even.

8. A static frequency changer for changing polyphase alternating current at one frequency to single phase alternating current at a different frequency comprising a plurality of similar saturable core transformers, means connecting similar windings of said transformers in star and in series respectively, and separate capacitances connected in parallel with each of said star connected windings.

9. A static frequency changer for converting polyphase alternating current at a given frequency to single phase alternating current at either of two reciprocally related frequencies, one of which is twice the polyphase frequency, comprising a plurality of similar saturable core transformers, the cores of said transformers being magnetically biased, similar windings of said transformers being connected in star and in series respectively, and separate capacitances connected in parallel with each of said star connected windings.

10. The combination with a source of alternating current of given frequency of means for producing a frequency of half said given frequency comprising a pair of oscillating circuits each including a capacitance and a saturable core reactance.

11. The combination with a source of alternating current of given frequency of means for producing a loadable oscillation frequency which is half of said given frequency comprising, a pair of series connected oscillating circuits connected to said source of given frequency, each of said oscillating circuits including a saturable core reactance and a capacitance, and windings inductively related to said reactances, said windings being connected so that the given frequency voltages induced therein are in opposition.

12. A static frequency changer for changing an alternating current at a given frequency to an alternating current at one half said frequency comprising a plurality of oscillating circuits which include inductive reactances with magnetically biased saturable cores.

In witness whereof, we have hereunto set our hands this 25th day of September, 1930.
ORIN P. McCARTY.
ARAM BOYAJIAN.